US012682128B2

(12) United States Patent
Li

(10) Patent No.: US 12,682,128 B2
(45) Date of Patent: Jul. 14, 2026

(54) CONTROL SYSTEM WITH SECURITY MANAGEMENT DEVICE

(71) Applicant: MONTAGE TECHNOLOGY CO., LTD., Shanghai (CN)

(72) Inventor: Yi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 275 days.

(21) Appl. No.: 18/060,969

(22) Filed: Dec. 2, 2022

(65) Prior Publication Data

US 2023/0185972 A1 Jun. 15, 2023

(30) Foreign Application Priority Data

Dec. 14, 2021 (CN) .......................... 202111529249.8

(51) Int. Cl.
*G06F 21/85* (2013.01)
(52) U.S. Cl.
CPC ...... *G06F 21/85* (2013.01); *G06F 2221/2141* (2013.01)
(58) Field of Classification Search
CPC .......................... G06F 21/85; G06F 2221/2141
See application file for complete search history.

(56) References Cited

U.S. PATENT DOCUMENTS

| | | | | |
|---|---|---|---|---|
| 10,063,669 B2 * | 8/2018 | Nakata | .................... | H04L 69/08 |
| 10,542,004 B1 * | 1/2020 | Perez | ........................ | G16Z 99/00 |
| 11,262,276 B2 * | 3/2022 | Kusaba | .............. | G05B 23/0227 |

(Continued)

FOREIGN PATENT DOCUMENTS

| | | |
|---|---|---|
| CN | 106295381 A | 1/2017 |
| CN | 109257261 A | 1/2019 |

(Continued)

OTHER PUBLICATIONS

The Search Report for the counterpart Chinese patent application 202111529249.8, mailed on Jul. 17, 2025.

*Primary Examiner* — Joseph L Greene
(74) *Attorney, Agent, or Firm* — Junhe Law Office P.C.; James J. Zhu

(57) ABSTRACT

The present application relates to a control system with a security management device. The control system comprises: a bus; one or more electronic devices coupled to the bus to transmit data with the bus through respective communication protocols; one or more security monitoring managers each coupled between an electronic device and the bus, wherein each of the security monitoring managers is configured to snoop data transmitted between the electronic device and the bus based on a predetermined transmission protocol, determine whether the data conforms to a predetermined authority management rule to generate a determination result, and selectively allow the data to be transmitted to the bus or the electronic device according to the determination result, and wherein the predetermined transmission protocol correspond to the communication protocol of the electronic device; and a central security manager coupled to the security monitoring managers, wherein the central security manager is configured to configure the predetermined transmission protocol and the predetermined authority management rule used by each of the security monitoring managers.

15 Claims, 7 Drawing Sheets

(56)                    References Cited

U.S. PATENT DOCUMENTS

| | | | | |
|---|---|---|---|---|
| 2007/0174910 A1* | 7/2007 | Zachman | ................. | G06F 21/79 |
| | | | | 726/18 |
| 2018/0121664 A1* | 5/2018 | Gourley | ................ | H04L 63/108 |
| 2018/0144119 A1* | 5/2018 | Kishikawa | ........ | H04L 12/40169 |
| 2019/0220627 A1* | 7/2019 | LeMasters | .............. | G06F 21/54 |
| 2022/0180009 A1* | 6/2022 | Remezov | ................ | G06F 21/85 |
| 2022/0309195 A1* | 9/2022 | Yamaoka | ............ | G06F 21/6209 |
| 2024/0184735 A1* | 6/2024 | Kim | .................. | H04L 12/40104 |

FOREIGN PATENT DOCUMENTS

| | | | |
|---|---|---|---|
| CN | 109379375 A | 2/2019 |
| CN | 109474607 A | 3/2019 |
| CN | 109587045 A | 4/2019 |
| CN | 110213143 A | 9/2019 |
| CN | 113163025 A | 7/2021 |
| CN | 113489675 A | 10/2021 |
| CN | 113704144 A | 11/2021 |
| KR | 20210081065 A | 7/2021 |

* cited by examiner

100

106

200

206

<u>700</u>     702

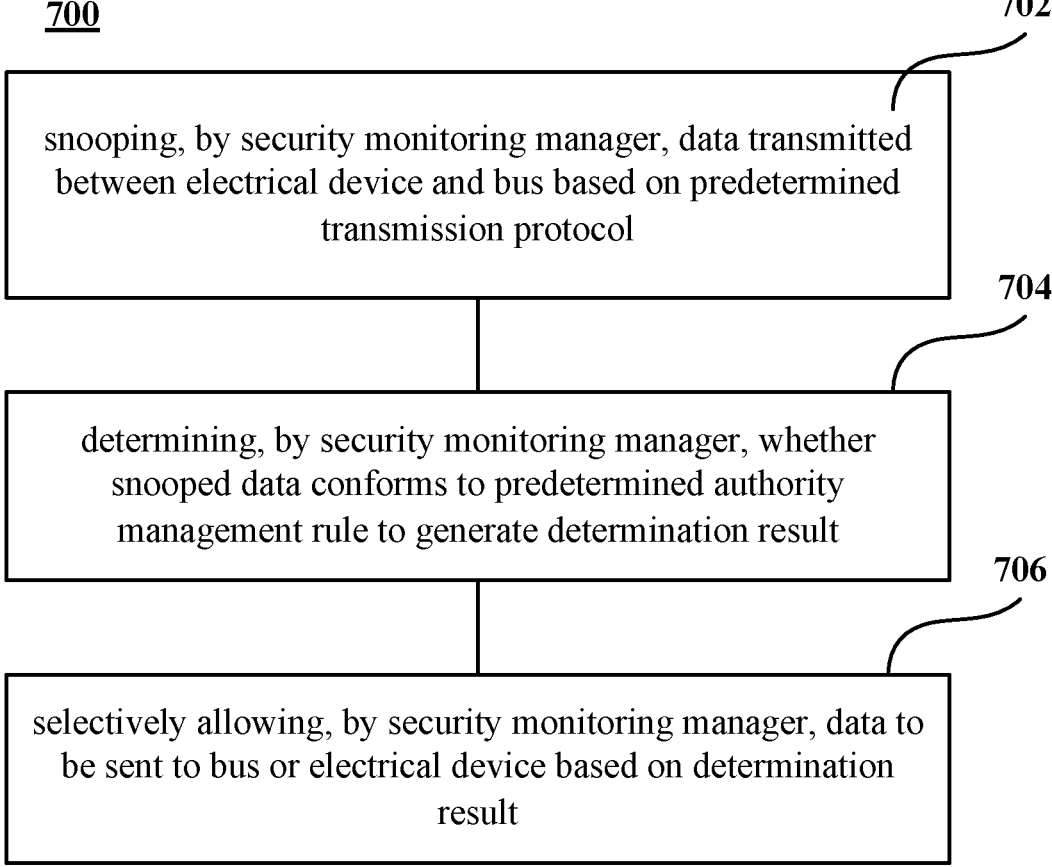

snooping, by security monitoring manager, data transmitted between electrical device and bus based on predetermined transmission protocol

704 determining, by security monitoring manager, whether snooped data conforms to predetermined authority management rule to generate determination result

706 selectively allowing, by security monitoring manager, data to be sent to bus or electrical device based on determination result

Figure 7

CONTROL SYSTEM WITH SECURITY MANAGEMENT DEVICE

FIELD OF THE INVENTION

The present application relates to the field of control system, and more specifically, to a control system with a security management device.

BACKGROUND OF THE INVENTION

In existing control systems, such as an industrial control system and an automobile control system, electronic devices such as induction devices and control devices are directly connected to a bus (such as the controller area network CAN bus, Profibus, etc.) to exchange data with the bus according to their respective communication protocols, so as to achieve communications between these electronic devices. For example, FIG. 1 schematically illustrates a part of an existing control system 100. As shown in FIG. 1, the control system 100 may include a temperature sensor 101, a distance sensor 102, a driving force controller 103, a power supply controller 104, and a heat dissipation controller 105, all of which are directly connected to a bus 106 for data exchange with the bus 106 based on their respective communication protocols.

However, in such existing control system, if an electronic device is hacked, the electronic device may be controlled to directly snoop the data transmitted on the bus, or even affect the operation of the entire control system by transmitting illegal requests. Therefore, the existing control system needs to be improved to have a more secure communication architecture.

SUMMARY OF THE INVENTION

According to one aspect of the present application, a control system is provided. The control system comprises: a bus; one or more electronic devices coupled to the bus to transmit data with the bus through respective communication protocols; one or more security monitoring managers each coupled between an electronic device and the bus, wherein each of the security monitoring managers is configured to snoop data transmitted between the electronic device and the bus based on a predetermined transmission protocol, determine whether the data conforms to a predetermined authority management rule to generate a determination result, and selectively allow the data to be transmitted to the bus or the electronic device according to the determination result, and wherein the predetermined transmission protocol correspond to the communication protocol of the electronic device; and a central security manager coupled to the security monitoring managers, wherein the central security manager is configured to configure the predetermined transmission protocol and the predetermined authority management rule used by each of the security monitoring managers.

In some embodiments, each of the security monitoring managers is further configured to transmit data that does not conform to the predetermined authority management rule to the central security manager for analysis to configure the predetermined authority management rule.

In some embodiments, each of the security monitoring managers comprises: a security management module configured with the predetermined transmission protocol and the predetermined authority management rule, wherein the security management module is configured to snoop the data transmitted between the electronic device and the bus based on the predetermined transmission protocol, and determine whether the data conforms to the predetermined authority management rule to generate the determination result; and a transmission control module coupled to the security management module to receive the determination result, wherein the transmission control module is configured to selectively allow the data to be transmitted to the bus or the electronic device according to the determination result.

In some embodiments, the security management module comprises: a transmission protocol module configured with the predetermined transmission protocol; an identification module coupled to the transmission protocol module to receive the predetermined transmission protocol, wherein the identification module is configured to snoop the data transmitted between the electronic device and the bus based on the predetermined transmission protocol; a security rule module configured with the predetermined authority management rule; and a determination module coupled to the security rule module to receive the predetermined authority management rule and coupled to the identification module to receive the data snooped by the identification module, wherein the determination module is configured to determine whether the data snooped by the identification module conforms to the predetermined authority management rule and generate the determination result.

In some embodiments, the central security manager comprises a protocol and rule configuration module, wherein the protocol and rule configuration module is coupled to the transmission protocol module and the security rule module of each of the security monitoring managers, wherein the protocol and rule configuration module is used to configure the predetermined transmission protocol and the predetermined authority management rule in the transmission protocol module and the security rule module of each of the security monitoring managers.

In some embodiments, the security management module further comprises a recording module coupled to the determination module, wherein the recording module is configured to record the data that does not conform to the predetermined authority management rule when the determination module determines that the data snooped by the identification module does not conform to the predetermined authority management rule; the central security manager further comprises: a storage module coupled to the recording module to receive and store the data recorded by the recording module that does not conform to the predetermined authority management rule, and a data analysis module coupled to the storage module to receive the data stored by the storage module that does not conform to the predetermined authority management rule, wherein the data analysis module is configured to analyze the data that does not conform to the predetermined authority management rule; wherein the protocol and rule configuration module is coupled to the data analysis module, and configured to configure the predetermined authority management rule based on analysis of the data that does not conform to the predetermined authority management rule by the data analysis module.

In some embodiments, the predetermined authority management rule includes: a type of the data transmitted between the electronic device and the bus; a target device for the data transmitted from the electronic device to the bus; a data amount range transmitted between the electronic device and the bus; and/or a format of the data transmitted between the electronic device and the bus.

In some embodiments, the security monitoring manager is configured to block the data or converts the data into invalid data for transmission when the determination result indicates that the data does not conform to the predetermined authority management rule.

In some embodiments, the security monitoring manager is configured to count an amount of data that does not conform to the predetermined authority management rule, and block subsequent data that does not conform to the predetermined authority management rule or converts the subsequent data that does not conform to the predetermined authority management rule into invalid data for transmission when the counted amount reaches a predetermined data amount threshold.

According to another aspect of the application, a security management device is provided. The security management device comprises: one or more security monitoring managers coupled between electronic devices and a bus, wherein each of the security monitoring managers is configured to snoop data transmitted between the electronic device and the bus based on a predetermined transmission protocol, determine whether the data conforms to a predetermined authority management rule to generate a determination result, and selectively allow the data to be transmitted to the bus or the electronic device according to the determination result, and wherein the predetermined transmission protocol corresponds to a communication protocol of the electronic device; and a central security manager coupled to the security monitoring managers, wherein the central security manager is configured to configure the predetermined transmission protocol and the predetermined authority management rule used by each of the security monitoring managers.

According to yet another aspect of the application, a security management method is provided. The method is used in a security management device. The security management device comprises a central security manager and one or more security monitoring managers, wherein each of the security monitoring managers is coupled between an electronic device and a bus, and the central security manager is coupled to the security monitoring managers, and is configured to configure a predetermined transmission protocol and a predetermined authority management rule for each of the security monitoring managers. The method comprises: snooping, by each of the security monitoring managers, data transmitted between an electronic device coupled to the security monitoring manager and the bus based on the predetermined transmission protocol, wherein the predetermined transmission protocol corresponds to a communication protocol between the electronic device and the bus; determining, by the security monitoring manager, whether the data conforms to the predetermined authority management rule to generate a determination result; and selectively allowing, by the security monitoring manager, the data to be transmitted to the bus or the electronic device based on the determination result.

BRIEF DESCRIPTION OF THE FIGURES

FIG. 7 illustrates a security management method according to an embodiment of the present application.

DETAILED DESCRIPTION OF THE INVENTION

The following detailed description refers to the accompanying drawings as a part of the present disclosure. In the figures, similar symbols generally represent similar components unless otherwise stated in the context. The illustrative embodiments described in the detailed description, the accompanying drawings and the claims are not limiting. Other embodiments may be adopted, or modifications may be made without deviation from the spirit and the subject of the disclosure. It can be understood that, the various aspects of the disclosure described and graphically presented herein may be arranged, replaced, combined, divided and designed in many different configurations, and these different configurations are implicitly included in the disclosure.

Figure 2:
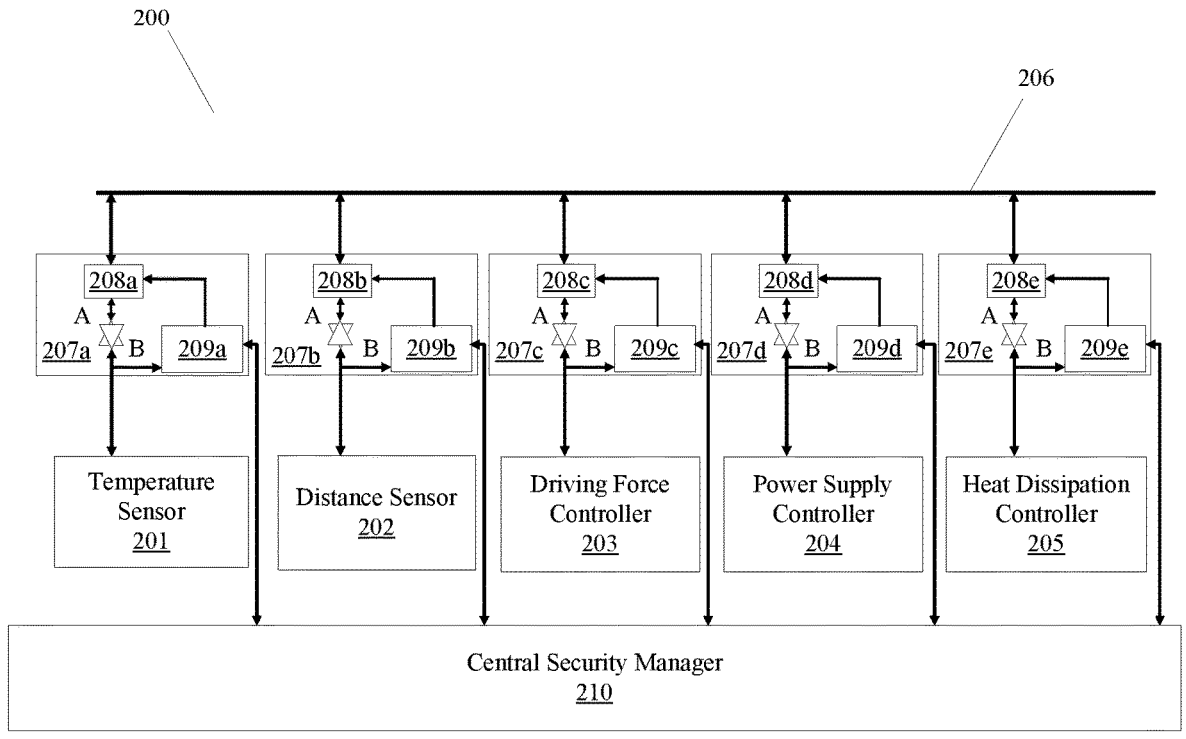
FIG. 2 illustrates a control system according to an embodiment of the present application.

FIG. 2 illustrates a part of a control system 200 according to an embodiment of the present application. Referring to FIG. 2, the control system 200 includes one or more electronic devices, such as a temperature sensor 201, a distance sensor 202, a driving force controller 203, a power supply controller 204, and a heat dissipation controller 205. These electronic devices are coupled to a bus 206 to achieve data communication therebetween. Those skilled in the art can understand that, according to practical needs, the control system 200 can include or be couple with various other types of electronic devices. For example, when the control system 200 is an automobile control system, it can also include, for example, a tire pressure sensor, an air conditioner controller, a wiper controller etc. The application does not limit the electronic devices that the control system can include or be couple with.

Figure 1:
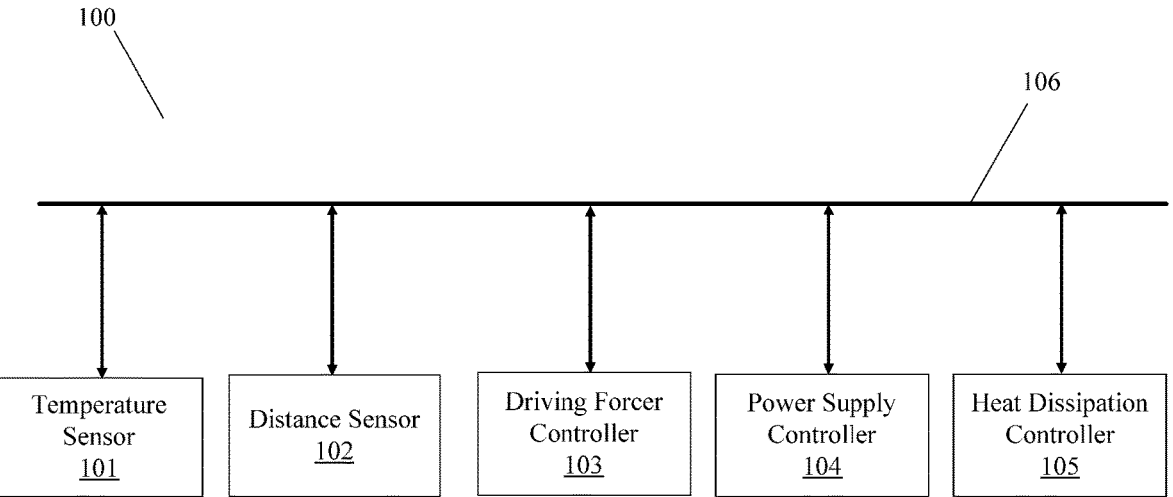
FIG. 1 illustrates a control system according to the prior art.

Different from the existing control systems (such as the control system 100 shown in FIG. 1), in the control system 200 shown in FIG. 2, each electronic device is not directly connected to the bus 206, but is coupled to the bus 206 through an additional security monitoring manager between each electronic device and the bus. For example, a first security monitoring manager 207a is disposed between the temperature sensor 201 and the bus 206, a second security monitoring manager 207b is disposed between the distance sensor 202 and the bus 206, a third security monitoring manager 207c is disposed between the driving force controller 203 and the bus 206, a fourth security monitoring manager 207d is disposed between the power supply controller 204 and the bus 206, and a fifth security monitoring manager 207e is disposed between the heat dissipation controller 205 and the bus 206. In some embodiments, each security monitoring manager can monitor the data transmitted between the coupled electronic device and the bus based on a configured predetermined transmission protocol, and optionally, each security monitoring manager can selectively block the transmission of illegal data or issue a warning for illegal data according to a predetermined authority management rule, thereby improving the security of the entire control system. The structure and operation of the security monitoring manager will be described in detail below. It should be noted that although in the embodiment shown in FIG. 2, each security monitoring manager is coupled to an electronic device, it can be understood by those skilled in the art that in some other embodiments, each security monitoring manager can also be coupled to a number of electronic devices and control the access security of these coupled electronic devices.

Specifically, as shown in FIG. 2, each security monitoring manager can include a main data path A coupled between the bus 206 and the corresponding electronic device and a branch data path B coupled to the main data path A. The main data path A is coupled with a transmission control module 208, and the branch data path B is coupled with a security management module 209. At the same time, the transmission control module 208 can also be coupled to the security management module 209 to receive a determination result (described in detail below) generated by the security management module 209 about whether the data transmitted between the bus 206 and the corresponding electronic device conforms to the predetermined authority management rule.

For the branch data path B of the security monitoring manager, the security management module 209 can be coupled to the main data path A and monitor the data transmitted on the main data path A in real time, that is, the security management module 209 can extract the data transmitted between the bus 206 and the corresponding electronic device. For electronic devices, they may communicate with the bus 206 based on different communication protocols. For example, the temperature sensor 201 may transmit data with the bus 206 based on a communication protocol A, the distance sensor 202 may transmit data with the bus 206 based on a communication protocol B, and the driving force controller 203 may transmit data with the bus 206 based on a communication protocol C. Different communication protocols mean that data from or to different electronic devices may have different formats. For example, based on the communication protocol A, the temperature sensor 201 may transmit data to the bus 206 with the following format: the first bit indicates the type of data (reading data/writing data), the second bit indicates the sensed temperature, the third bit indicates the element that the sensed temperature belongs to, the fourth bit indicates the electronic device that the data should be transmitted to, and so on. Accordingly, the data or instructions transmitted from the bus 206 to different electronic devices may also be based on different communication protocols, thus having different formats. Therefore, for each electronic device, the security management module 209 in the coupled security monitoring manager 207 can be configured with a predetermined transmission protocol corresponding to the communication protocol adapted for such electronic device, so that the security management module 209 can identify the format and content of the transmitted data so that it can snoop the data transmitted between the corresponding electronic device and the bus 206. It can be understood that each security monitoring manager 207 is configurable, therefore each security monitoring manager 207 can be correspondingly configured before or after being coupled to an electronic device.

The security management module 209 is also configured with a predetermined authority management rule. After snooping the data transmitted between an electronic device and the bus 206, each security management module 209 can determine whether the data transmitted between the electronic device and the bus 206 conforms to the predetermined authority management rules to generate a determination result. In one embodiment, the predetermined authority management rule may include a type of data transmitted between the corresponding electronic device and the bus 206. For example, for the temperature sensor 201, the corresponding predetermined authority management rule may prescribe that the temperature sensor 201 is only permitted to transmit data to the bus and not permitted to request data from the bus, since the temperature sensor 201 itself does not need to receive any data from the bus. Therefore, when the security management module 209a snoops that the temperature sensor 201 is transmitting data to the bus 206, the security management module 209a can determine that the data transmitted by the temperature sensor 201 to the bus 206 conforms to the predetermined authority management rule. When the security management module 209a snoops that the temperature sensor 201 is requesting data from the bus 206, the security management module 209a can determine that the data requested by the temperature sensor 201 from the bus 206 does not conform to the predetermined authority management rule.

In one embodiment, the predetermined authority management rule may also include a target device for the data transmitted by the corresponding electronic device to the bus 206. For example, for the distance sensor 202, the corresponding predetermined authority management rules may prescribe that the target device for the data transmitted by the distance sensor 202 should be the driving force controller 203, that is, the distance sensor 202 is only allowed to transmit data to the driving force controller 203 but not to transmit data to the power supply controller 204 or the heat dissipation controller 205, because the data transmitted by the distance sensor 202 may not be used for power supply, heat dissipation or other purposes. Therefore, when the security management module 209b snoops that the target device for the data transmitted from the distance sensor 202 to the bus 206 is the driving force controller 203, the security management module 209b determines that such data transmitted from the distance sensor 202 to the bus 206 conforms to the predetermined authority management rule. When the security management module 209b snoops that the target device for the data transmitted from the distance sensor 202 to the bus 206 is the power supply controller 204 or the heat dissipation controller 205, the security management module 209b determines that such data transmitted from the distance sensor 202 to the bus 206 does not conform to the predetermined authority management rule.

The above description of predetermined authority management rules is only exemplary. Those skilled in the art can understand that the security management module 209 can also generate a determination result based on other authority management rules. For example, the authority management rules can include a data amount range transmitted between the electronic device and the bus 206 (for example, the amount of data transmitted between a certain electronic device and the bus 206 at one time should not exceed 5 bits, and if the amount of data transmitted at one time exceeds 5 bits, such data should be determined as not conforming to the predetermined authority management rule). The authority management rules can also include the format of the data transmitted between the electronic devices and the bus 206 (for example, the data transmitted between a certain electronic device and the bus 206 should conform to a format A, and the transmitted data that does not conform to the format A should be determined as not conforming to the predetermined authority management rule) and so on. The application is not limited to any of these predetermined authority management rules.

Still referring to FIG. 2, the transmission control module 208 can receive the transmitted data from the corresponding electronic device or the bus through the main data path A where the transmission control module 208 is located. In addition, the transmission control module 208 is coupled to the security management module 209 in the same security monitoring manager to receive the determination result indicating whether the transmitted data conforms to the predetermined authority management rule. According to the determination result received from the security management module 209, the transmission control module 208 may process the data transmitted between the electronic device and the bus 206 accordingly to selectively allow the data to be transmitted to the bus 206 or the corresponding electronic device.

In one embodiment, if the security management module 209 determines that the transmitted data conforms to the predetermined authority management rule, the transmission control module 208 can directly provide the data to the bus 206 or the corresponding electronic device. On the contrary, if the security management module 209 determines that the transmitted data does not conform to the predetermined authority management rule, the transmission control module 208 can block the transmitted data, that is, no longer transmitting the data to the bus 206 or the corresponding electronic device.

In another embodiment, if the security management module 209 determines that the transmitted data conforms to the predetermined authority management rule, the transmission control module 208 can directly provide the data to the bus 206 or the corresponding electronic device; On the contrary, if the security management module 209 determines that the transmitted data does not conform to the predetermined authority management rule, the transmission control module 208 can convert the transmitted data into invalid data and optionally transmit the invalid data to the bus 206 or the corresponding electronic device. However, the transmission of the invalid data may not cause any security problems since the invalid data is meaningless.

In yet another embodiment, the transmission control module 208 may allow a small amount of data that does not conform to the predetermined authority management rule to be transmitted to the bus 206 or the corresponding electronic device. However, after the amount of data that does not conform to the predetermined authority management rule reaches a certain threshold, then the subsequent data that does not conform to the predetermined authority management rule is no longer allowed to be transmitted to the bus 206 or the corresponding electronic device. Specifically, the transmission control module 208 can configure a predetermined amount threshold. When the security management module 209 determines that the amount of data that does not conform to the predetermined authority management rules does not exceed the amount threshold, the transmission control module 208 may continue allowing the data that does not conform to the predetermined authority management rules to be transmitted to the bus 206 or the corresponding electronic device. At the same time, the transmission control module 208 may count the amount of data that does not conform to the predetermined authority management rules. After the security management module 209 determines that the amount of data that does not conform to the predetermined authority management rule reaches the amount threshold, then the subsequent data that does not conform to the predetermined authority management rule is no longer allowed to be transmitted to the bus 206 or the corresponding device (that is, blocking the data that does not conform to the predetermined authority management rule, or converting the data that does not conform to the predetermined authority management rule into invalid data, or to perform other restriction operations).

Optionally, the security management module 209 can record the data that does not conform to the predetermined authority management rule, and transmit the data that does not conform to the predetermined authority management rule to the central security manager 210 of the control system 200 for analysis, as described in detail below.

In one embodiment, the control system 200 also includes a central security manager 210, which is coupled to the one or more security monitoring managers 207. Preferably, the central security manager 210 may be coupled to each security monitoring manager 207. The central security manager 210 may configure the predetermined transmission protocol and authority management rule used by each of the security monitoring managers 207. In one embodiment, the central security manager 210 can configure the transmission protocols and authority management rules used by the security monitoring managers in advance, that is, send the predetermined transmission protocols and authority management rules to the corresponding security monitoring managers before the operation of the entire control system 200. Thus, the predetermined transmission protocol and authority management rule used by each security monitoring manager are preconfigured before the operation of the entire control system 200. In one embodiment, the central security manager 210 can dynamically configure the predetermined transmission protocol and authority management rule used by each security monitoring manager to which it is coupled, that is, during the operation of the entire control system 200, dynamically configuring the predetermined transmission protocol and authority management rule used by each security monitoring manager according to the operation status. For example, the central security manager 210 may set a data amount threshold for the data that can be tolerated for not conforming to the predetermined authority management rule.

In some embodiments, the central security manager 210 can be coupled to an external controller (such as a computer, a mobile phone, a tablet computer, etc. used by the user, which is not limited in this application), so that the user can send the configuration data to the central security manager 210 through the external controller, and then configure the predetermined transmission protocol and authority management rule used by each security monitoring manager 207.

In some embodiments, the central security manager 210 may store multiple sets of configuration data for configuring predetermined transmission protocols and authority management rules used by the security monitoring managers 207, and the central security manager 210 may be coupled to an external controller as described above to receive configuration instructions. The configuration instructions can instruct the central security manager 210 to select one set of configuration data from the multiple sets of stored configuration data to configure the predetermined transmission protocol and authority management rule used by each security monitoring manager 207.

In some embodiments, the central security manager 210 may automatically configure the predetermined transmission protocols and authority management rules used by the security monitoring managers 207. For example, the central security manager 210 can store multiple sets of preset configuration data for configuring predetermined authority management rules, and the central security manager 210 also stores different application conditions for each set of preset configuration data. During the operation of the control system 200, the central security manager 210 can automatically apply different sets of preset configuration data when different application conditions are met, so as to realize the automatic and dynamic configuration of predetermined authority management rules. For example, the central security manager 210 may store three sets of preset configuration data for the security monitoring manager 207c. The preset configuration data A does not limit any data from the driving force controller 203, the preset configuration data B prohibits all writing data from the driving force controller 203, and the preset configuration data C prohibits both writing data and reading data from the driving force controller 203. Initially, the central security manager 210 can configure the predetermined authority management rule of the security monitoring manager 207c with the preset configuration data A; when the frequency or the amount of sending or reading data from the driving force controller 203 to the bus 206 exceeds a certain threshold (for example, sending/reading data more than 5 times in a minute), the central security manager 210 can configure the predetermined authority management rule of the security monitoring manager 207c with the more strict preset configuration data B. After the amount or frequency that the data sent/read by the driving force controller 203 to the bus 206 violates the preset configuration data B exceeds a predetermined value, then the central security manager 210 can apply the most strict preset configuration data C to configure the predetermined authority management rule of the security monitoring manager 207c. In other words, the central security manager 210 can configure the predetermined authority management rules of the corresponding security monitoring managers 207 according to the data history from different electronic devices. For another example, the central security manager 210 can identify the electronic device coupled to each security monitoring manager 207. If some electronic devices in the control system 200 require any adjustments (for example, replacing the original temperature sensor 201 with a distance sensor), then the central security manager 210 can send the predetermined transmission protocol corresponding to the adjusted electronic device to the corresponding security monitoring manager 207. Thus, automatic configuration of the predetermined transmission protocols of the security monitoring managers 207 can be performed.

In some embodiments, the configuration data stored in the central security manager 210 may include transmission protocols (such as the transmission protocols used by various conventional electronic devices) and authority management rules that are common in multiple control fields, so that users can easily configure (for example, select) predetermined transmission protocols and predetermined authority management rules to meet specific operation requirements. In some embodiments, the user can customize the transmission protocols and authority management rules according to the specific operation requirements (for example, coupling the user's self-programmed or self-designed electronic device to the bus of the control system, or the user has personalized requirements for security effects), and transmit them to the central security manager 210. Therefore, the users can flexibly configure the predetermined transmission protocols and predetermined authority management rules according to personalized operation requirements.

Figure 3:
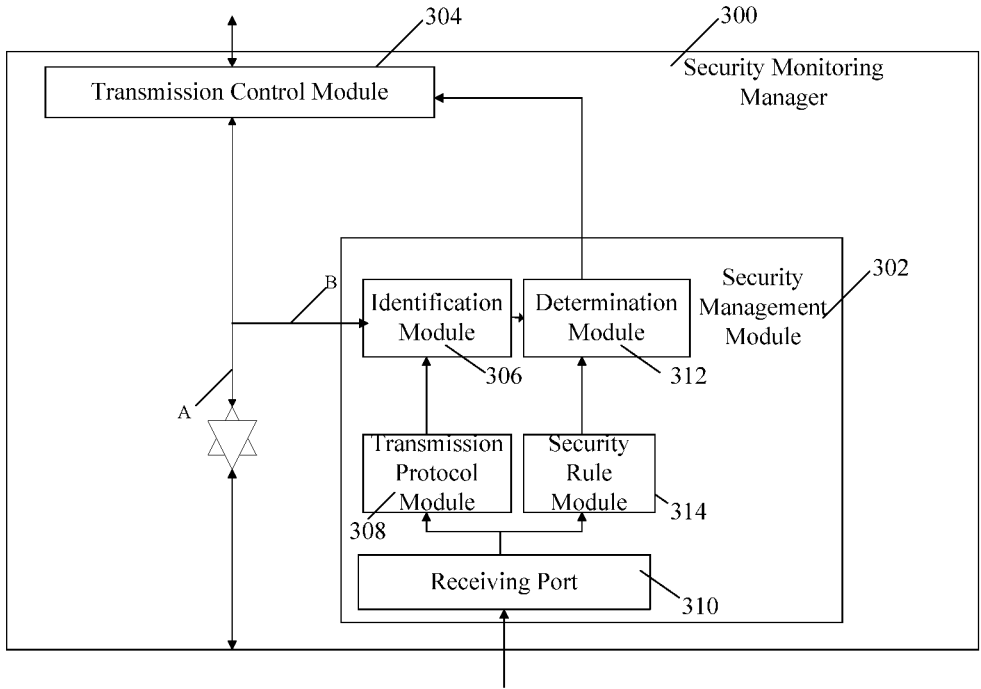
FIG. 3 illustrates a security monitoring manager according to an embodiment of the present application.
Figure 4:
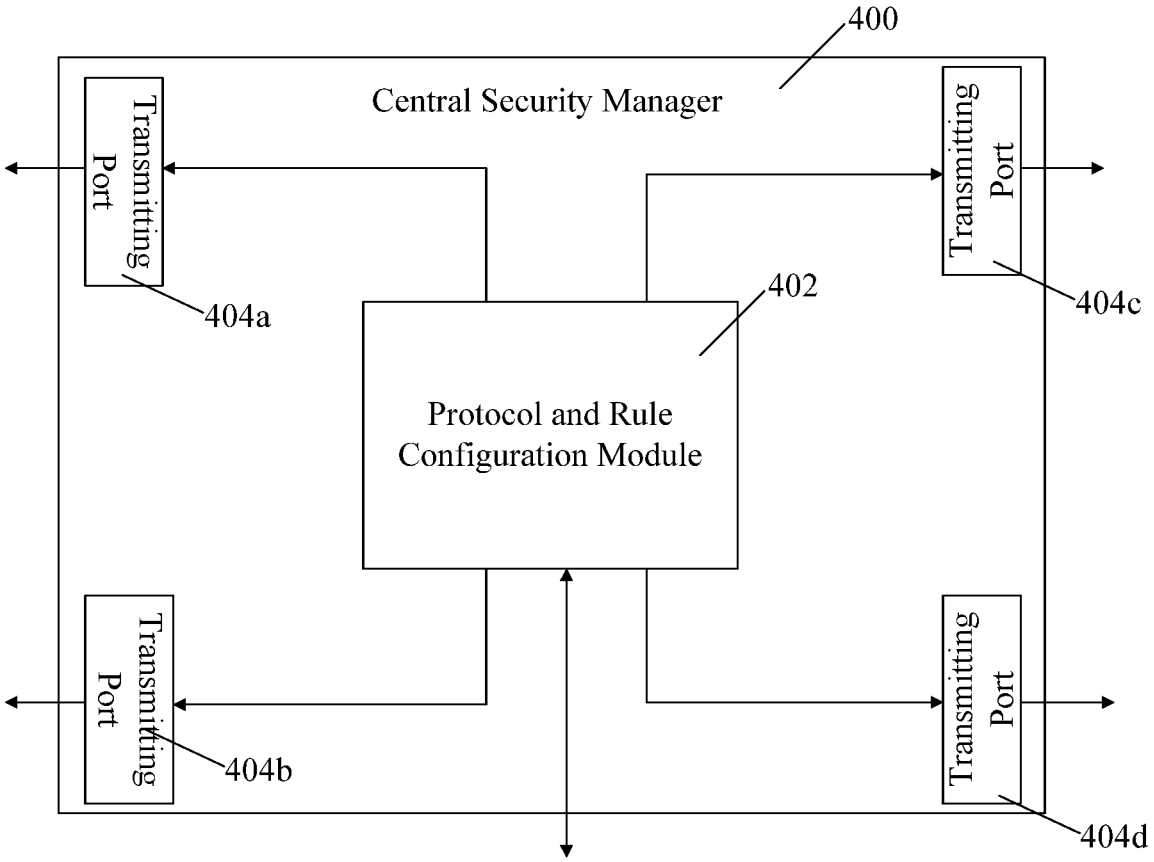
FIG. 4 illustrates a central security manager according to an embodiment of the present application.

FIG. 3 illustrates a security monitoring manager 300 according to an embodiment of the present application, and FIG. 4 illustrates a central security manager 400 according to an embodiment of the present application.

As shown in FIG. 3, the security monitoring manager 300 includes a main data path A and a branch data path B coupled to the main data path A. A security management module 302 is coupled to the branch data path B, and a transmission control module 304 is coupled to the main data path A. The transmission control module 304 is also coupled to the security management module 302 to receive determination results generated by the security management module 302 about whether the data transmitted between the corresponding electronic devices (such as the temperature sensor 201, the distance sensor 202, the driving force controller 203, the power controller 204, and the heat dissipation controller 205 shown in FIG. 2) and the bus (such as the bus 206 shown in FIG. 2) conforms to the predetermined authority management rules. The security management module 302 and the transmission control module 304 manage the data transmitted between the corresponding electronic device and the bus in the manner as described above in combination with FIG. 2.

In the embodiment shown in FIG. 3, the security management module 302 further includes an identification module 306. The identification module 306 is coupled to the main data path A to receive the data transmitted between the corresponding electronic device and the bus. The identification module 306 can snoop the data transmitted between the corresponding electronic device and the bus in real time, that is, it can extract the content of the data transmitted between the bus and the corresponding electronic device. In some embodiments, the predetermined authority management rule used by the security management module 302 does not require estimating all contents of the data transmitted between the bus and the corresponding electronic device, so the identification module 306 does not need to extract all contents of the transmitted data. For example, if the predetermined authority management rule used by the security management module 302 includes the target device for the data transmitted from the corresponding electronic device to the bus, the identification module 306 can only extract the content related to the target device of the data transmitted between the bus and the corresponding electronic device. The identification module 306 can selectively extract the content of the data transmitted between the bus and the corresponding electronic device according to practical needs, which is not limited in this application. After snooping the data transmitted between the bus and the corresponding electronic device, the identification module 306 sends the extracted content to a subsequent determination module 312 to determine whether it conforms to the authority management rule.

As described above, each electronic device can perform data transmission with the bus based on different communication protocols. In order to monitor the data transmitted between the corresponding electronic device and the bus, the security management module 302 also includes a transmission protocol module 308. The transmission protocol module 308 may include a storage element that stores a predetermined transmission protocol required by the identification module 306 for snooping data. The transmission protocol module 308 is coupled to the identification module 306 to provide the predetermined transmission protocol to the identification module 306. In addition, the transmission protocol module 308 is also coupled to a protocol and rule configuration module in the central security manager through a receiving port 310, so that the predetermined transmission protocol used for snooping data can be configured, which will be further described below with reference to FIG. 4.

The determination module 312 is coupled to the identification module 306 to receive the data content snooped by the identification module 306, and is also coupled to a security rule module 314 to receive the predetermined authority management rule stored therein. The determination module 312 can compare the received data content with the predetermined authority management rule to determine whether the data transmitted between the corresponding electronic device and the bus conforms to the predetermined authority management rule, such as those described above in combination with FIG. 2. After generating a determination result, the determination module 312 sends the determination result to the transmission control module 304 to process the data transmitted between the corresponding electronic device and the bus.

The security rule module 314 may include a storage element, which stores the predetermined authority management rule required by the determination module 312 for determination. The security rule module 314 is coupled to the determination module 312 to provide the predetermined authority management rule to the determination module 312. Optionally, the security rule module 314 may also be coupled to the identification module 306, so that the identification module 306 can selectively snoop the data transmitted between the corresponding electronic device and the bus according to the current authority management rule (for example, as described above, selectively extracting a part of contents from the data). In addition, the security rule module 314 is also coupled to the protocol and rule configuration module in the central security manager through the receiving port 310, so that the predetermined authority management rule used by the determination module 312 can be configured, which will be further described below with reference to FIG. 4.

The receiving port 310 is used to receive configuration data from the central security manager 400 to configure the predetermined transmission protocol and predetermined authority management rule in the transmission protocol module 308 and the security rule module 314. The receiving port 310 may be a high-speed port, such as a PCIe port, a CXL port, a wireless communication (Wireless) port, or other ports suitable for high-speed transmission, to increase the speed of receiving data. In some embodiments, the receiving port 310 may also be a common port such as an SMBus port (using I²C or similar protocol).

As shown in FIG. 4, the central security manager 400 includes a protocol and rule configuration module 402, which is used to configure the predetermined transmission protocols and predetermined authority management rules used by the security monitoring managers (such as the security monitoring manager 207 shown in FIG. 2 or the security monitoring manager 300 shown in FIG. 3). As described above in connection with FIG. 2, the protocol and rule configuration module 402 can configure the predetermined transmission protocols and predetermined authority management rules used by the security monitoring managers in advance, or dynamically configure the predetermined transmission protocols and predetermined authority management rules used by the security monitoring managers during the operation of the entire control system according to the operation status. In some embodiments, the protocol and rule configuration module 402 can be coupled to an external controller (such as a computer, a mobile phone, a tablet computer, etc. used by the user, which is not limited in this application), so that the user can transfer configuration data used to configure the predetermined transmission protocols and a predetermined authority management rules to the protocol and rule configuration module 402 through the external controller in order to configure the predetermined transmission protocol and predetermined authority management rule used by each security monitoring manager. In some embodiments, the protocol and rule configuration module 402 may include a storage element, which may store multiple sets of configuration data for configuring the predetermined transmission protocols and the predetermined authority management rules. In some embodiments, the protocol and rule configuration module 402 may be coupled to an external controller as described above to receive configuration instructions, which may instruct the protocol and rule configuration module 402 to select a set of configuration data from the multiple sets of configuration data to configure the predetermined transmission protocol and predetermined authority management rule used by each security monitoring manager. In some embodiments, the protocol and rule configuration module 402 can also automatically configure the predetermined transmission protocols and predetermined authority management rules used by the security monitoring manager. For example, in one embodiment, in addition to the multiple sets of configuration data used to configure the predetermined authority management rules and predetermined transmission protocols, the protocol and rule configuration module 402 stores an application condition for each set of the configuration data,. During the operation of the control system, the protocol and rule configuration module 402 can automatically apply different sets of configuration data when different application conditions are met to automatically and dynamically configure the authority management rules.

The protocol and rule configuration module 402 can be coupled to a corresponding receiving port of the security monitoring manager (such as the receiving port 310 shown in FIG. 3) through transmitting ports 404 (four transmitting ports 404 are shown in FIG. 4, but those skilled in the art can understand that the central security manager 400 may include any number of transmitting ports 404 according to practical needs) in order to configure the predetermined transmission protocol and predetermined authority management rule of each security monitoring manager. For example, the protocol and rule configuration module 402 can send a corresponding predetermined transmission protocol and a predetermined authority management rule to the transmission protocol module (such as the transmission protocol module 308 shown in FIG. 3) and the security rule module (such as the security rule module 314 shown in FIG. 3) in the security monitoring manager through the transmitting port 404 and the corresponding receiving port (such as the receiving port 310 shown in FIG. 3), respectively, in order to configure the predetermined transmission protocols and the predetermined authority management rules. In some embodiments, the transmission protocol module (such as the transmission protocol module 308 shown in FIG. 3) and the security rule module (such as the security rule module 314 shown in FIG. 3) in the security monitoring manager can respectively store multiple sets of predetermined transmission protocols and predetermined authority management rules. The protocol and rule configuration module 402 can no longer send predetermined transmission protocols and predetermined authority management rules to the transmission protocol module and the security rule module, but send configuration instructions through the transmitting port 404 and the corresponding receiving port to select an appropriate predetermined transmission protocol and a predetermined authority management rule from the multiple predetermined transmission protocols and predetermined authority management rules stored in the transmission protocol module and the security rule module. The transmitting port 404 may be a high-speed port, such as a PCIe port, a CXL port, a wireless communication port or other ports suitable for high-speed transmission, to increase the speed of data transmission. In some embodiments, the transmitting port 404 can also be a common port such as a SMBus port (using I²C or similar protocol).

Figure 5:
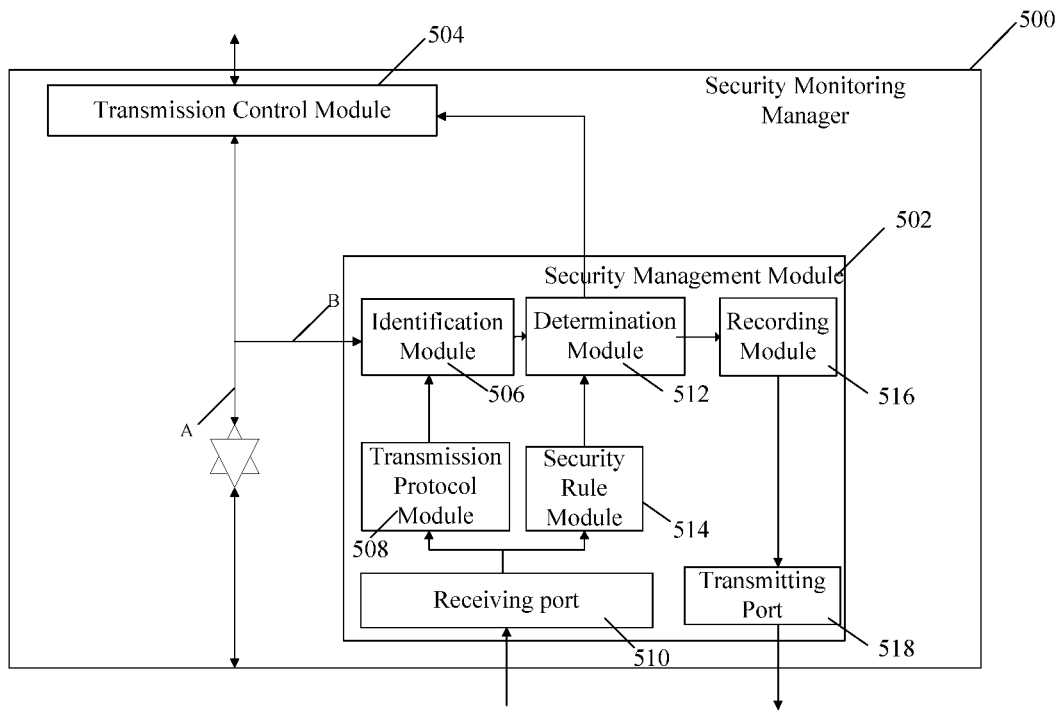
FIG. 5 illustrates a security monitoring manager according to another embodiment of the present application.

FIG. 5 illustrates an exemplary structure of a security monitoring manager according to another embodiment of the present application. The security monitoring manager 500 has a structure substantially similar to the security monitoring manager 300 shown in FIG. 3, such as a security management module 502, a transmission control module 504, wherein the security management module 502 includes an identification module 506, a transmission protocol module 508, a receiving port 510, a determination module 512, and a security rule module 514, which will not be repeated here.

The security monitoring manager 500 further includes a recording module 516. The recording module 516 is coupled to the determination module 512 to record the data estimated by the determination module 512 for subsequent analysis. In some embodiments, the recording module 516 can be configured to record all data, including data conforming to the predetermined authority management rule and data not conforming to the predetermined authority management rule. In some embodiments, the recording module 516 can also be configured to only record the data that does not conform to the predetermined authority management rule, which is not limited in the embodiments of the application. In some embodiments, the recording rules for recording data by the recording module 516 may be configured. Taking the recording module 516 only recording the data that does not conform to the predetermined authority management rule as an example, in some embodiments, the user may wish to analyze in detail the data that does not conform to the predetermined authority management rule, so the recording module 516 can be configured as recording all the contents of the data that does not conform to the predetermined authority management rule. In some embodiments, for example, the user may only wish to know which electronic device send the data that does not conform to the predetermined authority management rule, so the recording module 516 may be configured as only recording the source electronic device of the data that violates the authority management rules, thus making the subsequent analysis more concise and clear.

Those skilled in the art can understand that the recording module 516 may not be included in the security management module 502, but be formed as a separate module that is coupled with the security management module 502. In this way, the separate recording module can be coupled to the determination module in the verification module to record the corresponding data when the determination module determines that the data transmitted between the corresponding electronic device and the bus does not conform to the predetermined authority management rule.

The recording module 516 can send the recorded data (for example, the data that does not conform to the predetermined authority management rule) to a device outside the security monitoring manager 500 through a data transmitting port 518 for subsequent analysis. In some embodiments, the transmitting port 518 may be a high-speed port, such as a PCIe port, a CXL port, a wireless communication port or other ports suitable for high-speed information transmission, to increase the speed of data transmission. In some embodiments, the transmitting port 518 can also be a common port such as a SMBus port (using I²C or similar protocol).

In some embodiments, the recording module 516 can send the recorded data to an external controller (such as a computer, a mobile phone, a tablet computer, etc. used by the user, which is not limited in this application). In some embodiments, the recording module 516 may send the recorded data to the central security manager, for example, as described in detail below with reference to FIG. 6.

Figure 6:
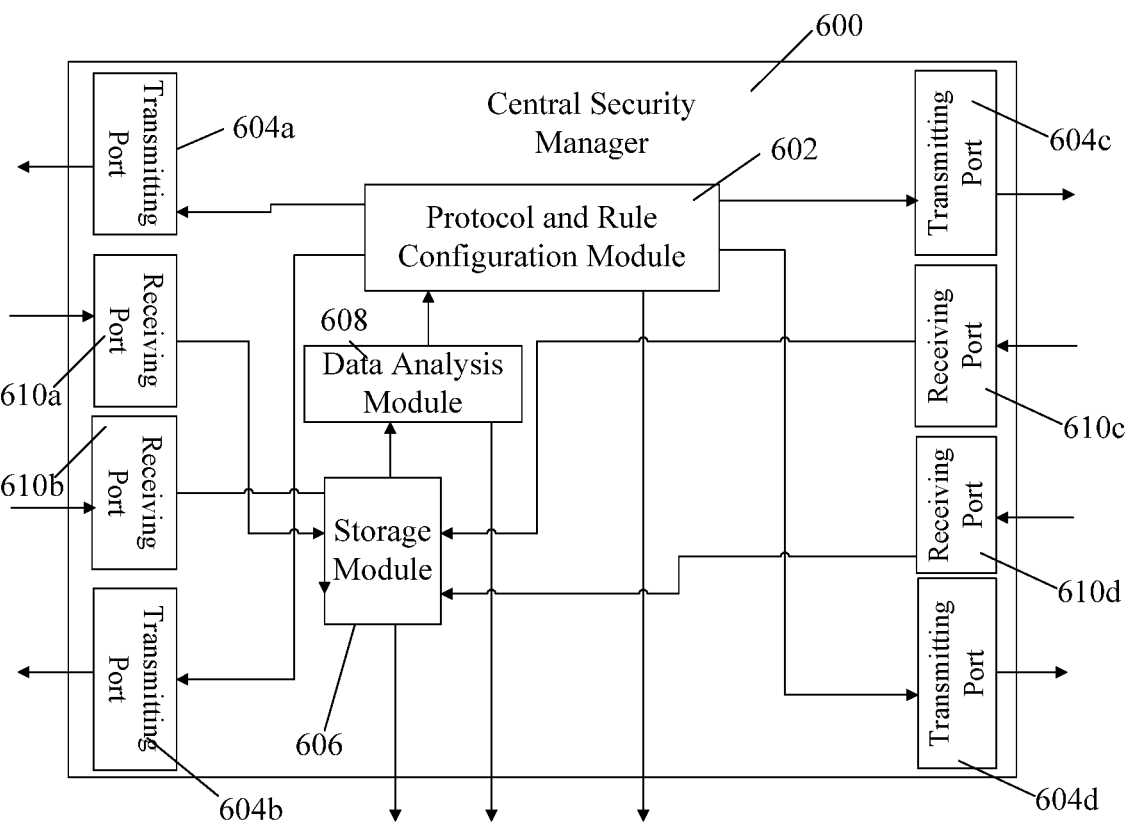
FIG. 6 illustrates a central security manager according to another embodiment of the present application.

FIG. 6 illustrates an exemplary structure of a central security manager 600 according to another embodiment of the present application. The central security manager 600 has a structure substantially similar to the central security manager 400 shown in FIG. 4, such as the protocol and rule configuration module 602 and the transmitting port 604, which will not be repeated here.

The central security manager 600 further includes a storage module 606. The storage module 606 may be a storage element for storing data (e. g., data that does not conform to the predetermined authority management rule) received from the recording module of the security monitoring manager (e. g., the security monitoring manager 500 shown in FIG. 5). The memory module 606 can also send its stored data to an external controller, such as a computer, a mobile phone, a tablet computer, etc. used by the user, which is not limited in this application.

The storage module 606 can be coupled to a data transmitting port (such as the data transmitting port 518 shown in FIG. 5) in the security monitoring manager through a data receiving port 610 to receive the data recorded by the recording module (such as the recording module 516 shown in FIG. 5) or other modules in the security monitoring manager. Four data receiving ports 610 are shown in FIG. 6, but those skilled in the art can understand that the central security manager 600 can include any number of data receiving ports 610 according to the actual situation. In some embodiments, the data receiving port 610 may be a high-speed port, such as a PCIe port, a CXL port, a wireless communication port or other ports suitable for high-speed transmission to increase the speed of receiving data. In some embodiments, the data receiving port 610 can also be a common port such as an SMBus port (using I²C or similar protocol).

The central security manager 600 also includes a data analysis module 608. The data analysis module 608 is coupled to the storage module 606 to receive the data stored in the storage module 606 (for example, data that does not conform to the predetermined authority management rule), so as to analyze such data. For example, in some embodiments, the data analysis module 608 can analyze and count the number of times that each electronic device sends/reads data that does not conform to the predetermined authority management rule to/from the bus based on the received data that does not conform to the predetermined authority management rule, so as to analyze whether any electronic device has been illegally attacked.

In some embodiments, the data analysis module 608 can be coupled to the protocol and rule configuration module 602, so that the central security manager 600 can differently configure the predetermined authority management rule or predetermined transmission protocol for each electronic device based on the analysis of data (for example, data that does not conform to the predetermined authority management rule). For example, the data analysis module 608 can analyze whether each electronic device has ever sent or read data that does not conform to the predetermined authority management rule to/from the bus, and set different trust levels for different electronic devices based on this analysis. For the electronic device that has never sent or read data that does not conform to the predetermined authority management rule to/from the bus, a higher trust level can be set, and a simpler predetermined authority management rule can be accordingly set. For the electronic device that has sent or read data that does not conform to predetermined authority management rules to/from the bus, a lower trust level can be set, and a more complex authority management rule can be accordingly set. By setting simpler authority management rules for the electronic devices with higher trust levels (so it takes less computing power and time to determine whether the date conforms to the authority management rule), and setting more complex authority management rules for electronic devices with lower trust levels (so it takes more computing power and time to determine whether the date conforms the authority management rules), the operation efficiency can be improved while ensuring system security. The data analysis module 608 can also send the analysis results to an external controller, such as a computer, a mobile phone, a tablet computer, etc. used by the user, which is not limited in this application.

Those skilled in the art can understand that the central security manager 600 may not include the storage module 606, but the data analysis module 608 is directly coupled to the data receiving port 610, so as to conduct real-time analysis of the received data. This application is not limited thereto.

FIG. 7 illustrates a method 700 for securely managing data transmitted between one or more electronic devices and a bus according to an embodiment of the present application. The method 700 may be executed by, for example, the security monitoring manager and the central security manager in the control system shown in FIG. 2 to FIG. 6.

As shown in FIG. 7, the method 700 can include a step 702: data transmitted between the electronic device and the bus is snooped by the security monitoring manager based on the predetermined transmission protocol.

In combination with the above description of the control system, a security monitoring manager is coupled between an electronic device and the bus. Each security monitoring manager can be configured with a predetermined transmission protocol and a predetermined authority management rule. The predetermined transmission protocol corresponds to the communication protocol between the electronic device and the bus. The security monitoring manager can snoop the data transmitted between the electronic device and the bus based on the predetermined transmission protocol. The predetermined transmission protocol and predetermined authority management rule can be preconfigured by the central security manager coupled to each security monitoring manager.

In step 704, whether the snooped data conforms to the predetermined authority management rule is determined by the security monitoring manager to generate a determination result.

In step 706, data is selectively allowed to be sent to the bus or the electronic device based on the determination result by the security monitoring manager.

In some embodiments, the method 700 can also include: recording, by the security monitoring manager, all the determined data (the data that conforms to the authority management rule and the data that does not conform to the authority management rule), or only when it is determined that data does not conform to the predetermined authority management rule, recording, by the security monitoring manager, the data that does not conform to the authority management rule.

In some embodiments, the method 700 can also include: sending the recorded data (such as all data, or data that does not conform to the authority management rule) to the central security manager; and analyzing the data by the central security manager.

In some embodiments, the method 700 can also include: configuring the predetermined authority management rule of each security monitoring manager based on the analysis of data by the central security manager.

It should be noted that although several steps of the method for accessing the memory module and several modules or sub-modules of in the memory controller are mentioned in the above detailed description, such division is exemplary and not mandatory. Practically, according to the embodiments of the present application, the features and functions of two or more modules described above can be embodied into one module. In contrast, the features and functions of a module described above can be further divided into multiple modules to be embodied. In addition, the order of the steps described in the present application is not mandatory, and the order of execution can be modified according to actual needs.

Those skilled in the art can understand and implement other variations to the disclosed embodiments from a study of the specification, the disclosure and accompanying drawings, and the appended claims. In the claims, the word "comprising" does not exclude other elements or steps, and the indefinite article "a" or "an" does not exclude a plurality. In applications according to present application, one element may conduct functions of several technical feature recited in claims. Any reference numerals of the drawings in the claims should not be construed as limiting the scope.

What is claimed is:

1. A control system comprising:

a bus;

one or more electronic devices coupled to the bus to transmit data with the bus through different communication protocols;

one or more security monitoring managers each coupled between an electronic device and the bus, wherein each of the security monitoring managers comprises:

a main data path coupled between the bus and a corresponding electronic device, wherein the main data path is coupled with a transmission control module;

a branch data path coupled to the main data path, wherein the branch data path is coupled with a security management module;

wherein the security management module is configured with a predetermined transmission protocol corresponding to the communication protocol adapted for the electronic device and a predetermined authority management rule, wherein the security management module is configured to extract and snoop data transmitted between the electronic device and the bus based on the predetermined transmission protocol, and determine whether the data conforms to the predetermined authority management rule to generate the determination result; and wherein the transmission control module is coupled to the security management module to receive the determination result, wherein the transmission control module is configured to selectively allow the data to be transmitted to the bus or the electronic device according to the determination result; and a central security manager coupled to the security monitoring managers, wherein the central security manager is configured to dynamically configure the predetermined transmission protocol and predetermined authority management rule used by each security monitoring manager to which it is coupled, analyze and count the number of times that each electronic device sends/reads data that does not conform to the predetermined authority management rule to/from the bus based on the received data that does not conform to the predetermined authority management rule and configure the predetermined transmission protocol and the predetermined authority management rule used by each of the security monitoring managers based on the analysis.

2. The control system of claim 1, wherein each of the security monitoring managers is further configured to transmit data that does not conform to the predetermined authority management rule to the central security manager for analysis to configure the predetermined authority management rule.

3. The control system of claim 1, wherein the security management module comprises:

a transmission protocol module configured with the predetermined transmission protocol;

an identification module coupled to the transmission protocol module to receive the predetermined transmission protocol, wherein the identification module is configured to snoop the data transmitted between the electronic device and the bus based on the predetermined transmission protocol;

a security rule module configured with the predetermined authority management rule; and a determination module coupled to the security rule module to receive the predetermined authority management rule and coupled to the identification module to receive the data snooped by the identification module, wherein the determination module is configured to determine whether the data snooped by the identification module conforms to the predetermined authority management rule and generate the determination result.

4. The control system of claim 3, wherein the central security manager comprises a protocol and rule configuration module, wherein the protocol and rule configuration module is coupled to the transmission protocol module and the security rule module of each of the security monitoring managers, wherein the protocol and rule configuration module is used to configure the predetermined transmission protocol and the predetermined authority management rule in the transmission protocol module and the security rule module of each of the security monitoring managers.

5. The control system of claim 4, wherein the security management module further comprises a recording module coupled to the determination module, wherein the recording module is configured to record the data that does not conform to the predetermined authority management rule when the determination module determines that the data snooped by the identification module does not conform to the predetermined authority management rule;

the central security manager further comprises:

a storage module coupled to the recording module to receive and store the data recorded by the recording module that does not conform to the predetermined authority management rule, and a data analysis module coupled to the storage module to receive the data stored by the storage module that does not conform to the predetermined authority management rule, wherein the data analysis module is configured to analyze the data that does not conform to the predetermined authority management rule;

wherein the protocol and rule configuration module is coupled to the data analysis module, and configured to configure the predetermined authority management rule based on analysis of the data that does not conform to the predetermined authority management rule by the data analysis module.

6. The control system of claim 1, wherein the predetermined authority management rule includes:

a type of the data transmitted between the electronic device and the bus;

a target device for the data transmitted from the electronic device to the bus;

a data amount range transmitted between the electronic device and the bus; and/or a format of the data transmitted between the electronic device and the bus.

7. The control system of claim 1, wherein the security monitoring manager is configured to block the data or convert the data into invalid data for transmission when the determination result indicates that the data does not conform to the predetermined authority management rule.

8. The control system of claim 1, wherein the security monitoring manager is configured to count an amount of data that does not conform to the predetermined authority management rule, and block subsequent data that does not conform to the predetermined authority management rule or convert the subsequent data that does not conform to the predetermined authority management rule into invalid data for transmission when the counted amount reaches a predetermined data amount threshold.

9. A security management device comprising:

one or more security monitoring managers coupled between electronic devices and a bus, wherein each of the security monitoring managers comprises:

a main data path coupled between the bus and a corresponding electronic device, wherein the main data path is coupled with a transmission control module; and a branch data path coupled to the main data path, wherein the branch data path is coupled with a security management module;

wherein the security management module is configured with a predetermined transmission protocol corresponding to the communication protocol adapted for the electronic device and a predetermined authority management rule, wherein the security management module is configured to extract and snoop data transmitted between the electronic device and the bus based on the predetermined transmission protocol, and determine whether the data conforms to the predetermined authority management rule to generate the determination result; and wherein the transmission control module is coupled to the security management module to receive the determination result, wherein the transmission control module is configured to selectively allow the data to be transmitted to the bus or the electronic device according to the determination result; and a central security manager coupled to the security monitoring managers, wherein the central security manager is configured to dynamically configure the predetermined transmission protocol used by each security monitoring manager to which it is coupled, analyze and count the number of times that each electronic device sends/reads data that does not conform to the predetermined authority management rule to/from the bus based on the received data that does not conform to the predetermined authority management rule and configure the predetermined transmission protocol and the predetermined authority management rule used by each of the security monitoring managers based on the analysis.

10. The security management device of claim 9, wherein each of the security monitoring managers is further configured to transmit data that does not conform to the predetermined authority management rule to the central security manager for analysis to configure the predetermined authority management rule.

11. The security management device of claim 9, wherein the security management module comprises:

a transmission protocol module configured with the predetermined transmission protocol;

an identification module coupled to the transmission protocol module to receive the predetermined transmission protocol, wherein the identification module is configured to snoop the data transmitted between the electronic device and the bus based on the predetermined transmission protocol;

a security rule module configured with the predetermined authority management rule; and a determination module coupled to the security rule module to receive the predetermined authority management rule and coupled to the identification module to receive the data snooped by the identification module, wherein the determination module is configured to determine whether the data snooped by the identification module conforms to the predetermined authority management rule and generate the determination result.

12. The security management device of claim 11, wherein the central security manager comprises a protocol and rule configuration module, wherein the protocol and rule configuration module is coupled to the transmission protocol module and the security rule module of each of the security monitoring managers, wherein the protocol and rule configuration module is used to configure the predetermined transmission protocol and the predetermined authority management rule in the transmission protocol module and the security rule module of each of the security monitoring managers.

13. The security management device of claim 12, wherein the security management module further comprises a recording module coupled to the determination module, wherein the recording module is configured to record the data that does not conform to the predetermined authority management rule when the determination module determines that the data snooped by the identification module does not conform to the predetermined authority management rule;

the central security manager further comprises:

a storage module coupled to the recording module to receive and store the data recorded by the recording module that does not conform to the predetermined authority management rule, and a data analysis module coupled to the storage module to receive the data stored by the storage module that does not conform to the predetermined authority management rule, wherein the data analysis module is configured to analyze the data that does not conform to the predetermined authority management rule;

wherein the protocol and rule configuration module is coupled to the data analysis module, and configured to configure the predetermined authority management rule based on analysis of the data that does not conform to the predetermined authority management rule by the data analysis module.

14. A security management method used in a security management device comprising a central security manager and one or more security monitoring managers, wherein each of the security monitoring managers is coupled between an electronic device and a bus, each of the security monitoring managers comprises a main data path coupled between the bus and a corresponding electronic device and coupled with a transmission control module, a branch data path coupled to the main data path and coupled with a security management module, wherein the security management module is configured with a predetermined transmission protocol corresponding to the communication protocol adapted for the electronic device, and the transmission control module is coupled with the main data path, and the central security manager is coupled to the security monitoring managers, and configured to dynamically configure the predetermined transmission protocol used by each security monitoring manager to which it is coupled, analyze and count the number of times that each electronic device sends/reads data that does not conform to the predetermined authority management rule to/from the bus based on the received data that does not conform to the predetermined authority management rule and configure a predetermined transmission protocol and a predetermined authority management rule for each of the security monitoring managers based on the analysis, and wherein the method comprises:

extracting and snooping, by each of the security monitoring managers, data transmitted between an electronic device coupled to the security monitoring manager and the bus based on the predetermined transmission protocol;

determining, by the security monitoring manager, whether the data conforms to the predetermined authority management rule to generate a determination result; and selectively allowing, by the security monitoring manager, the data to be transmitted to the bus or the electronic device based on the determination result.

15. The method of claim 14, further comprising:

recording, by the security monitoring manager, data that does not conform to the predetermined authority management rule when determining that the data does not conform to the predetermined authority management rule; and transmitting the data that does not conform to the authority management rule to the central security manager to analyze the data that does not conform to the predetermined authority management rule, and configuring the predetermined authority management rule of each of the security monitoring managers based on the analysis of data that does not conform to the predetermined authority management rule by the central security manager.

\* \* \* \* \*